United States Patent [19]

Nitzsche et al.

[11] 3,886,118

[45] May 27, 1975

[54] ROOM TEMPERATURE CURABLE COMPOSITIONS

[75] Inventors: Siegfried Nitzsche; Paul Hittmair; Wolfgang Hechtl; Eckhart Louis; Ernst Wohlfarth, all of Burghausen, Germany

[73] Assignee: Wacker-Chemie GmbH, Munich, Germany

[22] Filed: Aug. 29, 1973

[21] Appl. No.: 392,704

[30] Foreign Application Priority Data
Aug. 29, 1972 Germany............................ 2242378

[52] U.S. Cl........ 260/46.5 G; 260/18 S; 260/37 SB; 260/45.7 R; 260/448.8; 260/827
[51] Int. Cl. ............................................ C08f 11/04
[58] Field of Search....... 260/46.5 G, 45.7 R, 448.8, 260/827, 18 S

[56] References Cited

UNITED STATES PATENTS

| | | | |
|---|---|---|---|
| 3,296,195 | 1/1967 | Goossens...................... | 260/46.5 G |
| 3,714,089 | 1/1973 | Hamilton et al.............. | 260/46.5 G |

*Primary Examiner*—Melvyn I. Marquis

[57] ABSTRACT

The invention relates to silicone compositions which are stable under anhydrous conditions, but cure to elastomeric solids at room temperature when exposed to moisture which conprises a diorganopolysiloxane containing condensible groups and a methyl-tert-butoxyacetoxysilicon cross-linking agent which is obtained from the reaction of tert-butoxyacetoxysilanes and methyltriacetoxysilane at a weight ratio of 3:7 to 1:9 at temperatures of at least 120°C.

5 Claims, No Drawings

ROOM TEMPERATURE CURABLE COMPOSITIONS

This invention relates to curable compositions and more particularly to organopolysiloxane compositions which upon exposure to moisture are curable at room temperature to elastomeric solids.

Organopolysiloxane compositions which are curable at room temperature are well known in the art. Many of these organopolysiloxane compositions are stable in the absence of moisture, but cure to an elastomeric solid when exposed to moisture. One type of room temperature curable composition is the type described in French Pat. No. 1,198,749 which materials are prepared by the addition of an organotriacyloxysilane, such as methyltriacetoxy silane, to a silanol chain stopped polydiorganosiloxane fluid.

While these curable compositions have extremely wide utility and are satisfactory for a great many applications, these materials have one or more disadvantages. For example, methyltriacetoxysilane has a melting point above room temperature. Consequently, this compound must be first liquefied by heating and many times the diorganopolysiloxanes and additives must be heated in order to assure an even distribution of the methyltriacetoxysilane in the composition. Moreover, due to the relatively high melting point, crystals of methyltriacetoxysilane, can form and separate out in these compositions during storage at relatively moderate temperatures, such as at +5°C. During curing, the crystals form methylsilicic acid impurities during hydrolysis, which due to their roughness, decrease the smoothness of the elastomers thus formed from said compositions and thereby cause deterioration of the elastomers' physical properties. These disadvantages occur even when methyltriacetoxysilane is employed in mixtures with e.g. ditert-butoxy-diacetoxysilane according to German Auslegeschrift 1,282,967.

Even though vinyltriacetoxysilane has a lower melting point than methyltriacetoxysilane and thus eliminates some of the disadvantages of methyltriacetoxysilane as a cross-linking agent it still has several disadvantages. (See German Offenlegungsschrift 1,420,336) For example, vinyltriacetoxysilane is very sensitive to moisture and reacts much too rapidly. This complicates the preparation of the compounds unless air having a normal humidity content is completely excluded, a technique which would substantially increase production costs. Moreover, elastomers which employed vinyltriacetoxysilane as a cross-linking agent have a tendency to yellow in sunlight and especially in ultra-violet light. This is especially true for transparent elastomers.

Room temperature curable organopolysiloxanes which employ alkoxyacyloxysilanes as cross-linking agents are described in U.S. Pat. No. 3,296,195 to Goossens. The alkoxyacyloxysilanes may be prepared by reacting organotrialkoxysilanes with organotriacytoxysilane to form an equilibrium mixture, which upon fractional distillation produces alkoxyacyloxysilanes. The cross-linking agents of this invention are more stable under storage conditions than the compounds produced according to U.S. Pat. No. 3,296,195 to Goossens. Moreover, the resulting elastomers do not tend to yellow when exposed to light as do elastomers which are produced when vinyltriacytoxysilane is used as a cross-linking agent. Furthermore, the elastomers of this invention adhere to substrates as well as elastomers prepared according to German Auslegeschrift 1,282,967, even in the absence of a primer. In addition the physical characteristics are better than the elastomers produced according to German Offenlegungsschrift 2,116,816 which employ the reaction products of alkoxysilanes and acetoxysilanes.

It is an object of this invention to provide an organopolysiloxane which is stable under anhydrous conditions. Another object of this invention is to provide an organopolysiloxane which is curable to an elastomeric solid when exposed to atmospheric moisture. Still another object of this invention is to provide a cross-linking agent which is liquid at room temperature and does not crystallize at room temperature. A further object of this invention is to provide a cross-linking agent which is not as reactive to moisture as vinyltriacytoxysilane. Still a further object of this invention is to provide a cross-linking agent which is stable on storage. A still further object of this invention is to provide an elastomeric composition which will not yellow when exposed to ultraviolet light.

The foregoing objects and others which will become apparent from the following description are accomplished in accordance with this invention, generally speaking, by providing an organopolysiloxane composition which can be stored in the absence of moisture and will cure at room temperature in the presence of moisture to form a solid elastomer. These organopolysiloxane compositions may be prepared by mixing diorganopolysiloxanes having condensable terminal groups with a methyl-tert-butoxyacetoxysilicon cross-linking agent in the presence of condensation catalysts, if desired, in which the cross-linking agent is obtained from the reaction of tert-butoxyacetoxysilanes with methyltriacetoxysilane in a weight ratio of 3:7 to 1:9 at temperatures of at least 120°C.

Among the diorganopolysiloxanes having condensable end groups which can be used within the scope of this invention are those which have heretofore been used in the preparation of organopolysiloxane compositions which can be stored under dry conditions, but which cure to an elastomeric solid at room temperature in the presence of moisture. Generally the preferred type of diorganopolysiloxanes which can be employed within the scope of this invention, are represented by the general formula:

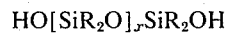

$$HO[SiR_2O]_xSiR_2OH$$

in which R represents the same or different monovalent hydrocarbon radicals, substituted monovalent hydrocarbon radicals and polymer hydrocarbon radicals and $x$ represents a whole number having a value of at least 10.

In addition to the diorganosiloxane units ($SiR_2O$), other siloxane units may also be present within or along the siloxane chain according to the above indicated formula, although they are not customarily indicated in formulae of this kind. Examples of such other siloxane units which may be present are those which correspond to the formulae $RSiO_{3/2}$, $R_3SiO_{1/2}$ and $SiO_{4/2}$, where R has the same meaning as above. The amount of such other siloxane units should however not exceed about 10 mol percent. Still other siloxane units, such as the ones corresponding to the formula $-OSiR_2R'SiR_2-$ where R has the same meaning as above and R' represents a bivalent hydrocarbon radical, such as for instance a phenyl radical, can be present in larger amounts. If desired, the hydroxyl groups of the above indicated formula, can be entirely or partially replaced with other —SiOH condensable groups such as acyloxy groups, alkoxy groups or alkoxyalkoxy groups, such as for example those of the formula $CH_3OCH_2CH_2O$.

Examples of hydrocarbon radicals represented by R are alkyl radicals such as methyl-, ethyl-, propyl-, butyl-, hexyl- and octadecyl radicals; alkenyl radicals, such as vinyl-, allyl-, ethylallyl-, and butadienyl radicals; aryl radicals such as the phenyl radical; alkaryl radicals such as the tolyl radical; and aralkyl radicals, such as the beta-phenylethyl radical.

Examples of substituted hydrocarbon radicals represented by R are especially halogenated hydrocarbon radicals such as the 3, 3, 3-trifluoropropyl radical, chlorophenyl- and bromotolyl radicals and cyanoalkyl radicals, such as the beta-cyanoethyl radical.

Examples of polymer (including so-called modified) substituted and unsubstituted hydrocarbon radicals are the ones which are derived by means of addition polymerization from such polymerizable compounds as styrene, vinylacetate, acrylic and methacrylic acid, acrylic and methacrylic acid esters and/or acrylonitrile.

It is preferred that a majority of the R radicals be composed of methyl radicals. Other radicals which may be present are the phenyl and/or vinyl radicals.

The diorganopolysiloxanes are preferably homo- or copolymers. Mixtures containing several diorganopolysiloxanes can also be employed.

The viscosity of the diorganopolysiloxanes having condensable end groups is generally between 1000 to 500,000 cP at 25°C.

The tert-butoxyacetoxysilanes employed in the reaction with methyltriacetoxysilane as well as the resulting organosilicon compounds obtained from this reaction can be mixtures.

The tert-butoxyacetoxysilanes used in the reaction with methyltriacetoxysilane preferably correspond to the general formula:

$$[(CH_3)_3CO]_a Si[OCOCH_3]_{4-a}$$

in which a has an average value of 1.2 to 2.

When a has a value below 1.2, crystal separation occurs and when a has a higher value, the reactivity of the reaction product is decreased.

The tert-butoxyacetoxysilanes can be prepared for example by reacting silicon tetraacetate with tert-butanol, or by reacting tetra-tert-butylsilicate with acetic acid anhydride. In addition the tert-butoxyacetoxysilanes may be prepared by reacting silicon tetraacetate with potassium-tert-butylate, or by reacting tetratert-butylsilicate with silicon tetraacetate. Methods for preparing these silanes are described in U.S. Pat. No. 3,246,195. It is preferred that these reactions be carried out in the absence of moisture.

Preferably the tert-butoxyacetoxysilanes which are reacted with methyltriacetoxysilane have been obtained from the reaction of silicon tetraacetate with tert-butanol at a mol ratio of 0.5 to approximately 0.75. According to the NMR spectrum, they have the average formula:

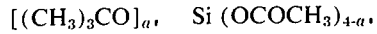

where a' has a value of 1.5. If 0.5 mol of tert-butanol is used, a large amount of unreacted silicon tetraacetate may precipitate from the reaction product.

It is preferred that the reaction between tert-butoxyacetoxysilanes and methyltriacetoxysilane be conducted at a temperature below 180°C. and more preferably between about 150° and 170°C. This reaction is also carried out in the absence of moisture. Generally, the reaction between tert-butoxyacetoxysilanes and methyltriacetoxysilane is carried out at atmospheric pressure, i.e. at a pressure of 680 to 800 mm Hg (abs.). However, higher or lower pressures may be employed, if desired. The reaction of the tert-butoxyacetoxysilanes with methyltriacetoxysilane can be accelerated by the addition of known catalysts for the reaction of alkoxysilanes with acyloxysilanes, such as ferric chloride or acid clays. The reaction is terminated when a test at −10°C. shows no or practically no crystallization after the addition of methyltriacetoxysilane. It is preferred that the volatile components be subsequently distilled from the reaction mixture.

If the tert-butoxyacetoxysilanes are reacted with methyltriacetoxysilane at a weight ratio below 1:9, the products obtained have a tendency to crystallize, which is undesirable. If the tert-butoxyacetoxysilanes are reacted with methyltriacetoxysilane at a weight ratio higher than 3:7, then the composition is less stable in storage.

It is preferred that the organosilicon compounds which are obtained through the reaction of tert-butoxysilanes with methyltriacetoxysilane be employed in amounts of from 1 to 15 percent by weight, and preferably in amounts of from 3 to 8 percent by weight based on the total weight of the organopolysiloxane composition from which elastomers are formed.

In addition to the diorganopolysiloxanes having condensable end groups and the methyl-tert-butoxyacetoxysilicon cross-linking agents, the compositions of this invention may also include other additives, such as condensation catalysts, reinforcing and/or non-reinforcing fillers, pigments, soluble dyes and aromatics. Other additives are organopolysiloxane resins, pure organic resins as well as polyvinyl chloride powder, corrosion inhibitors, oxidation inhibitors, heat stabilizers, agents which stabilize the compounds against the influence of water such as acetic acid anhydride, solvents and softeners, as well as liquid dimethylpolysiloxanes which are endblocked by trimethylsiloxy groups and polyglycols which can be etherated and/or esterified. If the diorganopolysiloxanes to be cross-linked contain some SiC-bonded organic groups, such as aliphatic multiple-bond groups, especially vinyl groups, then it is advantageous to use organic peroxides in amounts of from 0.01 to 5 percent by weight based on the weight of the diorganopolysiloxanes.

Examples of suitable condensation catalysts are metal salts and organometallic salts, especially tin and organo-tin salts of carboxylic acids, especially di-n-butyl-tindiacetate, as well as dibutyl tin dilaurate and dibutyltin salts of aliphatic carboxylic acids which are branched in the alpha position to the carboxyl group and contain from 9 to 11 carbon atoms.

Examples of reinforcing fillers, i.e. fillers having a surface area of at least 50 m²/g, are pyrogenically produced silicon dioxide and silicon dioxide aerogels, i.e. silicic acid hydrogels which have been dehydrated while maintaining the structure, and precipitated silicon dioxide with a surface area of at least 50 m²/g. All of these reinforcing fillers may be treated with organosilicon compounds such as trimethylethoxysilane, to provide organosilyl groups on their surface.

Examples of non-reinforcing fillers, i.e. fillers having a surface area of less than 50 m²/g, are quartz powder, diatomaceous earth, calcium silicate, zirconium silicate, so-called molecular sieves and calcium carbonate.

Fibrous fillers such as asbestos, glass fibers and/or organic fibers can also be employed. The fillers are preferably used in amounts varying from 5 to 90 percent by weight, based on the total weight of the organopolysiloxane and the filler.

When the diorganopolysiloxanes having condensable end groups are mixed with the organosilicon cross-linking agents of this invention as well as condensation catalysts, if desired, and other additives, moisture is preferably excluded whenever possible. However, one of the advantages of this invention is that during the mixing any residue which may have been deposited on the outside of the mixing elements, for instance on the walls of the mixing vessel or on stirrer shafts, can be recombined with the remainder of the composition without having to circulate completely dry air throughout the entire mixing device to avoid contaminating the remainder of composition by adding portions of cured elastomer thereto.

The compounds which are the subject of the invention can be stored under anhydrous conditions. They cure into elastomers at room temperature when exposed to air with the normal moisture content of air being adequate for curing. If desired, the curing step can also take place at temperatures higher than ambient temperature and/or in the presence of steam which exceeds the normal water content of the air and/or by adding water in liquid form. When moisture is added in the form of steam or liquid water, curing is accelerated.

The elastomers thus formed using the cross-linking agents of this invention adhere to the surfaces of most substrates, such as glass, porcelain, crockery, aluminum, wood or artificial resins, without any need for the preliminary priming of such surfaces and without adding to the compounds which are the subject of the invention any additional agents to increase their adhesive properties. If desired, the surfaces may be treated with a primer and/or adhesion improving agents may be added to the compositions of this invention.

The compositions of this invention are particularly adopted for caulking and sealing applications where adhesion to various surfaces is important. For example, these materials are useful in household caulking applications and industrial applications such as on buildings, factories, automotive equipment and in applications where adhesion to masonry, glass, plastic, metal and wood is required. Other uses for the compositions of this invention are as adhesives for the manufacture of protective coverings and as paper coatings and in the formation of stratified materials.

The embodiments of this invention are further illustrated by the following examples in which all parts are by weight unless otherwise specified.

EXAMPLE 1

Preparation of tert-butoxyacetoxysilane

About 85 parts of silicon tetrachloride (0.5 mol) were mixed, in the absence of water, with 234.5 parts of 98% by weight acetic acid anhydride (2 mole+approx. 15 mol percent) and 23.5 parts of ferric acid and heated to boiling under reflux and constant stirring for 8 hours. The volatile components are then distilled out at a bath temperature of 90°C. and approx. 760 mm Hg (abs.) and finally at 70°C. and 10 mm Hg (abs.), leaving a crystalline residue of silicon tetraacetate.

The silicon tetraacetate (0.5 mol) is mixed at room temperature and in the absence of water with 56.24 parts of tert-butanol (0.75 mol+approx. 1.5 mol percent). The solution thus obtained which is almost entirely devoid of solids is stirred for 2 hours in a bath at 70°C., in the absence of water. Subsequently the volatile components are distilled out at a bath temperature of 70°C. at 10 mm Hg (abs.). About 140 parts of a faintly yellowish liquid are obtained. According to the NMR spectrum this liquid corresponds to the formula

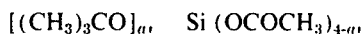

where $a'$ has a value of approx. 1.5.

EXAMPLE 2 a. In accordance with the process described in Example 1, a mixture containing 85 parts of methyltriacetoxysilane and 15 parts of the tert-butoxyacetoxysilane mixture of Example 1 is stirred for 8 hours under anhydrous conditions at a bath temperature of 165°C. After 8 hours of stirring a test sample of the thus-obtained liquid composition which contains methyl-tert-butoxyacetoxysilane silicon compounds, when injected with methyltriacetoxysilane at −10°C. does not form crystals.

b. For purposes of comparison a mixture containing 85 parts of methyltriacetoxysilane and 15 parts of the tert-butoxyacetoxysilane mixture of Example 1 crystallizes without injecting additional methyltriacetoxysilane. The mixture contains only a very small residue of liquid and does not melt when the temperature is increased to ambient temperature.

c. The following materials are mixed with each other in the following sequence:
1. 100 parts of a hydroxyl terminated dimethylpolysiloxane having a viscosity of 74,000 cP at 25°C.,
2. 35 parts of a trimethylsiloxy endblocked dimethylpolysiloxane having a viscosity of 33 cP at 25°C.,
3. about 6 parts of the liquid containing methyl-tert-butoxyacetoxysilicon compounds prepared in accordance with the method described in Example 2 (a),
4. 14 parts of pyrogenically produced silicon dioxide (fume silica),
5. about 3 parts of the liquid containing methyl-tert-butoxyacetoxysilicon compounds prepared in accordance with the method described in Example 2 (a) and about
6. 2 drops of di-n-butyltindiacetate. The resulting composition is identified as Composition A.

d. For purposes of comparison, the method described in Example 2 (c) is repeated, except that the same amount of vinyltriacetoxysilane is substituted for the methyl-tert-butoxyacetoxysilicon compounds. This composition is identified as Composition B.

Both compositions can be stored in the absence of water and both cure to a non-sticking elastomer when exposed to atmospheric moisture. Skeins prepared from these elastomers having a cross-section of 5×15 mm are exposed to ultraviolet light irradiation. After only one day the elastomer skein made from composition B is brownish in color. The elastomer skein made from composition A has not changed in color even after 3 days of irradiation.

e. For purposes of further comparison, the method described in Example 2 (c) is repeated except that a tert-butoxyacetoxysilane mixture prepared in accordance with Example 1 is substituted in the same amount for the methyl-tert-butoxyacetoxysilane composition prepared in accordance with Example 2 (a). The viscosity of the resultant composition increases while being stored under anhydrous conditions and ultimately the composition loses its ability to form an elastomer. A skein of the 3-day-old composition cures after three additional days into a non-sticking elastomer. After one month of storage a skein of this composition is still sticky when it is exposed for 6 days to atmospheric moisture and after 14 days of exposure to atmospheric conditions, the skein has not fully cured.

EXAMPLE 3 a. The method described in Example 2 (a) is repeated and subsequently the volatile components are distilled from the thus-obtained liquid at a bath temperature of 80°C. at 10 mm Hg (abs.). When a test sample of the liquid thus-obtained is injected with methyltriacetoxysilane at −10°C., crystal formation does not occur.

b. The following substances are mixed with each other in the sequence indicated:
1. About 100 parts of a dimethylpolysiloxane containing terminal Si-bonded hydroxyl groups and having a viscosity of 76,000 cP at 25°C.,
2. 38 parts of a dimethylpolysiloxane endblocked with trimethylsiloxy groups and having a viscosity of 33 cP at 25°C.,
3. 4.5 parts of the liquid from which the volatile components have been removed as described in Example 3 (a),
4. 15 parts of pyrogenically produced silicon dioxide.
5. 2.3 parts of the liquid from which the volatile components have been distilled as described in Example 3 (a),
6. 2 drops of di-n-butyltindiacetate. The composition is stable when stored under anhydrous conditions. Test samples of this compound are placed on aluminum, glass and ceramic tile substrates without prior priming. The composition forms an elastomeric solid on these surfaces. Four days after application of the composition, the above-mentioned covered surfaces are immersed in water where they are left for four weeks. After four weeks, the compositions still adhere to the substrates.

While specific embodiments of the invention have been described, it should not be limited to the particular compositions. It is intended, therefore, to include all modifications within the spirit and scope of this invention.

What is claimed is:

1. A composition which is stable under anhydrous conditions and is curable at room temperature to an elastomeric solid when exposed to atmospheric moisture which comprises diorganopolysiloxanes having terminal groups which are condensable and a cross-linking agent which is obtained from the reaction of tert-butoxyacetoxysilanes with methyltriacetoxysilane in a weight ratio of 3:7 to 1:9 at a temperature of at least 120°C.

2. The composition of claim 1, wherein the tert-butoxyacetoxysilane may be represented by the formula

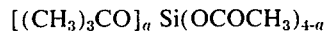

where a has an average value of 1.2 to 2.

3. The composition of claim 1 wherein the tert-butoxyacetoxysilanes have been obtained from the reaction of silicon tetraacetate with tert-butanol at a mol ratio of from 0.5 to about 0.75.

4. The composition of claim 1 which contains a condensation catalyst.

5. The composition of claim 4, wherein the condensation catalyst is a metallic salt of a carboxylic acid.

* * * * *